United States Patent [19]
Good et al.

[11] Patent Number: 5,493,887
[45] Date of Patent: Feb. 27, 1996

[54] COLD HEADER PIERCED VALVE STEM

[75] Inventors: William M. Good, Elkhart, Ind.;
Junior W. Rhodes, Nacogdoches, Tex.;
Andrejs Pavuls, Mishawaka, Ind.

[73] Assignee: Nibco Inc., Elkhart, Ind.

[21] Appl. No.: 240,253

[22] Filed: May 10, 1994

[51] Int. Cl.⁶ .................................................. B21K 1/20
[52] U.S. Cl. ........................................ 72/356; 29/890.123
[58] Field of Search ..................... 22/356; 29/890.123; 470/29

[56] References Cited

U.S. PATENT DOCUMENTS

| | | | |
|---|---|---|---|
| 2,344,803 | 3/1944 | Criley | 72/356 |
| 2,581,774 | 1/1952 | Stone et al. | 29/890.123 |
| 3,176,329 | 4/1965 | Frame | 470/29 |
| 3,587,157 | 6/1971 | Mundt | 72/356 |

FOREIGN PATENT DOCUMENTS 318787 9/1929 United Kingdom .................... 72/356

Primary Examiner—Lowell A. Larson
Attorney, Agent, or Firm—Price, Heneveld, Cooper, DeWitt & Litton

[57] ABSTRACT

A method of cold forming a plumbing and heating valve stem by providing a cylindrical blank workpiece, axially stamping the workpiece to circumferentially reduce and axially lengthen a portion of the workpiece, axially stamping the circumferentially larger portion to form a circumferentially enlarged head on the larger portion, while punching a central axial cylindrical cavity in the head to a depth no greater than the axial thickness of said head, and then axially punching the cylindrical axial cavity to a depth greater than the thickness of the head and also stamping a central cylindrical axial cavity into the opposite end, forming self tapping screw cavities. The larger portion is then provided with rolled threads.

7 Claims, 3 Drawing Sheets

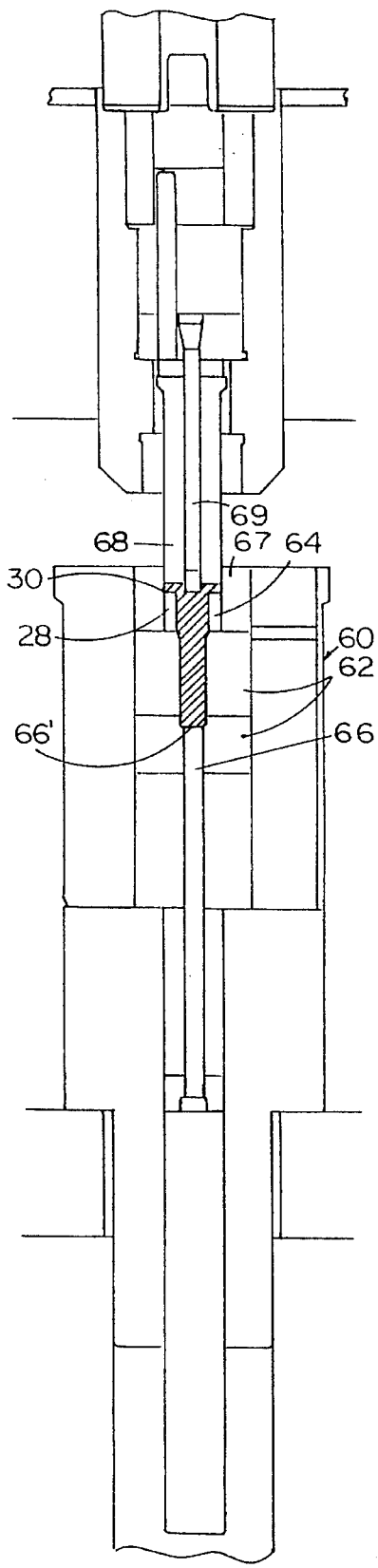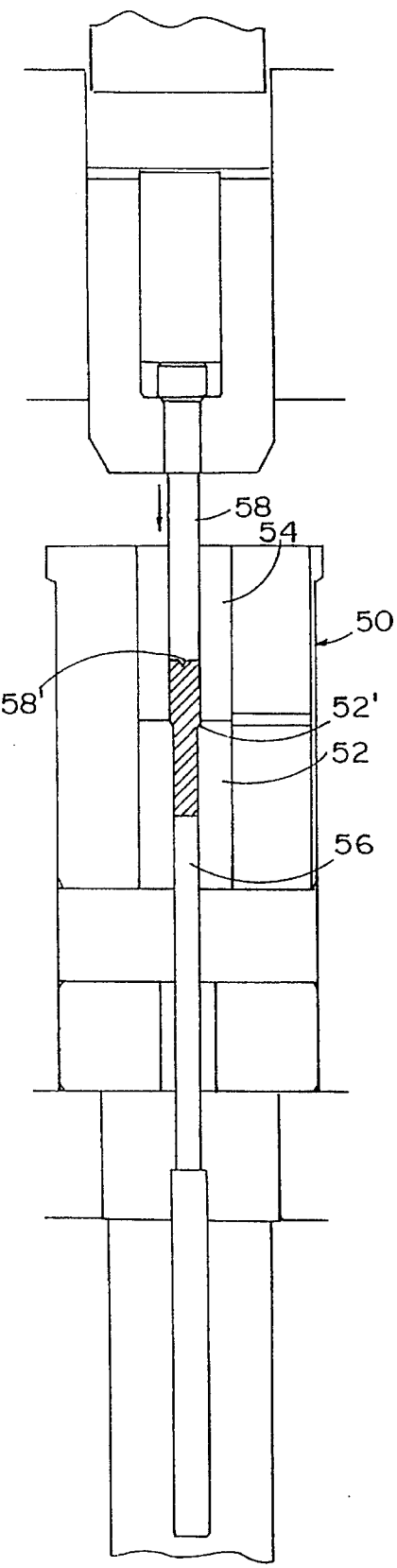
FIG. 8
FIG. 7

5,493,887

1
COLD HEADER PIERCED VALVE STEM

BACKGROUND OF THE INVENTION

This invention relates to valve stems for plumbing and heating valves, and more particularly to cold forming of complete headed valve stems without machining operations.

Valve stems for plumbing and heating valves are typically made of various copper alloys such as silicon brass, silicon bronze, yellow brass, red brass, DHP copper, and oxygen-free copper. The older manufacturing technique was to cast the blanks, machine them to result in the final product which comprised only about thirty percent of the original casting, the rest being scrap or recycled base. Subsequently, cold forming has been practiced, enabling successive cold heading of a workpiece blank to a desired overall configuration, followed by drilling and tapping screw holes into both axial ends. These drilling and tapping operations on both ends require costly production steps, especially since the small hole size and the "gumminess" of the metal material results in short drill and tap life.

The inventors herein conceived of a cold stamping process and product providing self-tapping holes in the axial ends of the cold headed stamping, so that drilling and tapping would not be necessary, and so that there would be no scrap/waste from machining operations, i.e., the stem would be one hundred percent net shaped. The cylindrical cavities on the axial ends could then receive self-tapping screws for assembly of the valve handle or handwheel on one end and the valve seat disc on the other end. However, efforts to stamp the holes in the head end of the workpiece resulted in unexpected problems. When the cylindrical punch was activated to punch the hole or cavity, the resulting hole would turn out off center, and/or oblong, and/or considerably larger than the punch, and often had other irregularities. For example, a cavity punched into the head end of the valve stem might be 0.700 inch deep when punched with a 0.400 inch long punch. The resulting products could not be effectively used because of these defects. Moreover, it was not at all apparent why this was occurring.

By extensive experimentation, the inventors ultimately determined how to cold form a no scrap valve stem, forming the valve stem without machining operations, and with properly sized and shaped, punched cylindrical cavities in the two axial ends thereof for receiving self-tapping screws to mount the handwheel and valve seat disc.

SUMMARY OF THE INVENTION

Therefore, the present invention provides a no scrap, one-hundred percent net shaped, cold formed headed valve stem formed directly from the blank workpiece and having self-tapping, punched cavities in both axial ends thereof. There is no need to machine the workpiece with a lathe, a drill or a tap. The cylindrical axial cavities in the ends are of proper configuration and size to receive self-tapping screws for attachment of the valve handle and the valve seat disc to the opposite ends of the valve stem.

The blank workpiece is cold formed by axially stamping the workpiece to circumferentially reduce and axially lengthen one end portion of the workpiece, while also making a central axial indent in the second, larger, opposite end, then axially stamping the large end portion again to circumferentially enlarge that portion into a head on the larger portion, while simultaneously stamping an axial cylindrical cavity into the head, at the previously formed indent, to a depth no greater than the axial thickness of the head, and also simultaneously stamping a central axial indentation into the opposite, axial, smaller diameter end of the workpiece, then axially stamping the cylindrical axial cavity in the head to a depth greater than the thickness of the head while simultaneously stamping a central cylindrical axial cavity into the opposite smaller diameter end at the indentation. Splines are then formed into the outer periphery of the smaller end portion of the workpiece by forcing the workpiece into a cavity which has spline forming rib elements in its periphery. These splines are for being subsequently received in a valve handle. Finally, threads are rolled into the outer periphery of the larger portion of the workpiece adjacent the head.

These and other objects, advantages and features of the invention will be apparent from a review of the following specification in conjunction with the drawings.

BRIEF DESCRIPTION OF THE DRAWINGS

FIG. 7 is an elevational view of a cold header die assembly showing the first steps performed on the workpiece blank;

FIG. 8 is an elevational sectional view of the second die station showing the second steps performed on the workpiece;

DETAILED DESCRIPTION OF THE PREFERRED EMBODIMENTS

Figure 1:
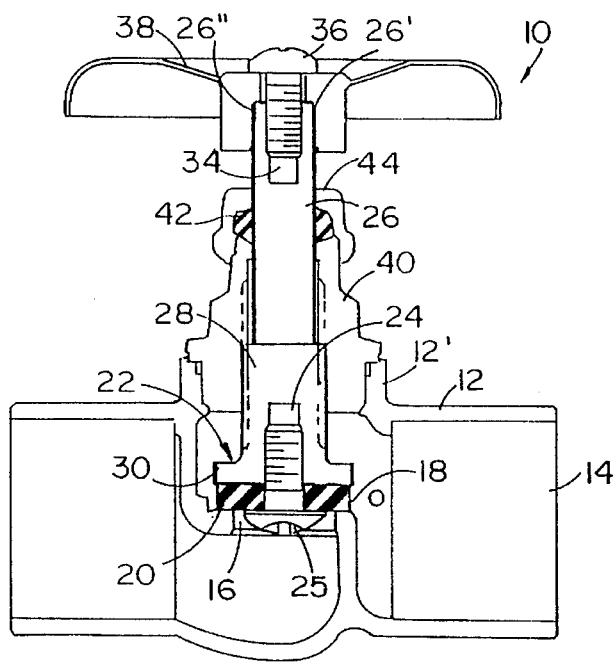
FIG. 1 is a sectional, elevational view of a complete valve showing a valve stem as a component thereof.
Figure 2:
FIG. 2 is an elevational view of a cylindrical workpiece blank to be formed into a valve stem.
Figure 3:
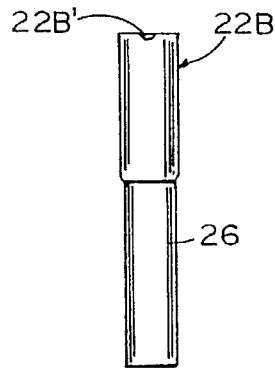
FIG. 3 is an elevational view of the workpiece after the first cold forming steps are performed to circumferentially reduce and lengthen one end portion and axially indent the second, larger, opposite end, i.e., the blank end.

Referring now specifically to the drawings, the valve assembly 10 depicted in FIG. 1 includes a conventional valve body 12 defining a passage 14 therethrough, in the central portion of which is a flow channel 16 surrounded by an annular valve seat 18. This valve seat 18 is adapted to be closed by a valve disc 20 mounted on the end of a valve stem 22 by a disc screw 25 having threads which threadably engage with a screw receiving cylindrical cavity 24 extending through head 30 in that axial end of valve stem 22. Valve stein 22 includes a smaller diameter, elongated, cylindrical end portion 26, a larger diameter, cylindrical central portion 28, and a still larger diameter head 30 at the end of portion 28. The larger portion 28, the head 30 and smaller portion 26 are all of one integral construction formed from a blank. In the axial end 26' of cylindrical portion 26 opposite to the head end 30, the valve stem includes a second, axial, cylindrical, central, elongated cavity 34 for receiving threaded handle screw 36 that holds handle, e.g., handwheel, 38 on the valve stem. The outer periphery of end 26 has axially oriented splines 26" to interengage with cooperating mating splines within the bore of handwheel 38. The exterior of valve 10 has a conventional bonnet 40, packing 42 and pack nut 44. Body 12 includes an tipstanding collar 12' transverse to flow passage 14, and open on the outer end to receive bonnet 40 which is threadably engaged in collar 12'. Valve stem 22, and specifically the larger portion 28 thereof, has threads rolled into its outer periphery so as to threadably engage with mating threads inside bonnet 40. Rotation of handle 38 and valve stem 26 causes the valve stem to move axially toward or away from valve seat 18 of valve body 12, to close or open the valve in conventional fashion.

Figure 6:
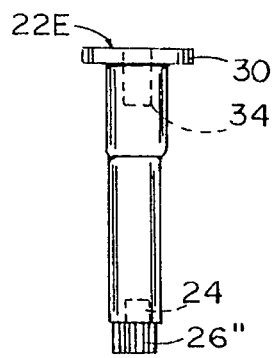
FIG. 6 is an elevational view of the workpiece after the fourth steps are performed on the workpiece to form the exterior splines.
Figure 10:
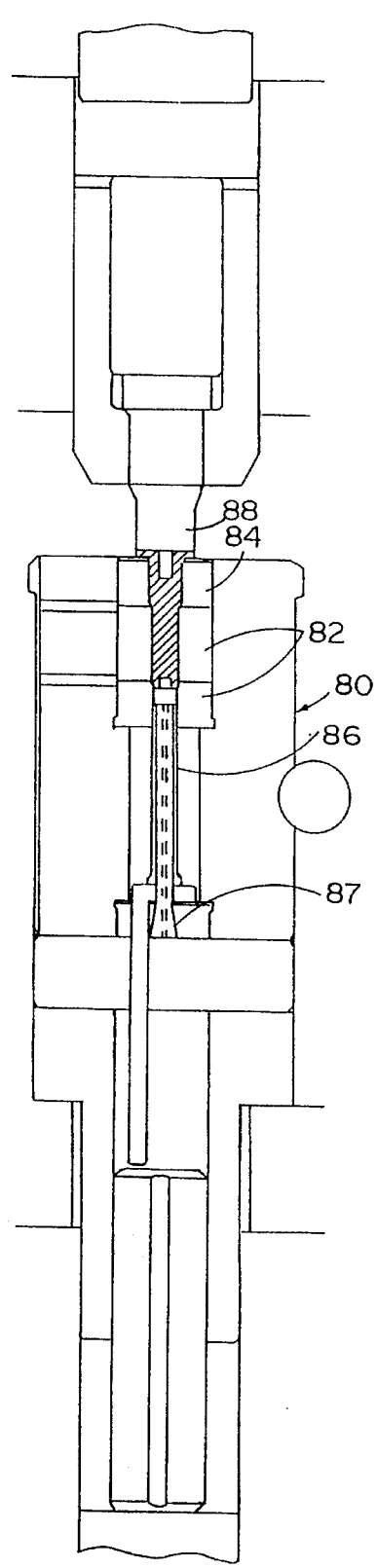
FIG. 10 is a sectional elevational view of the fourth station showing the fourth steps performed on the workpiece.
Figure 9:
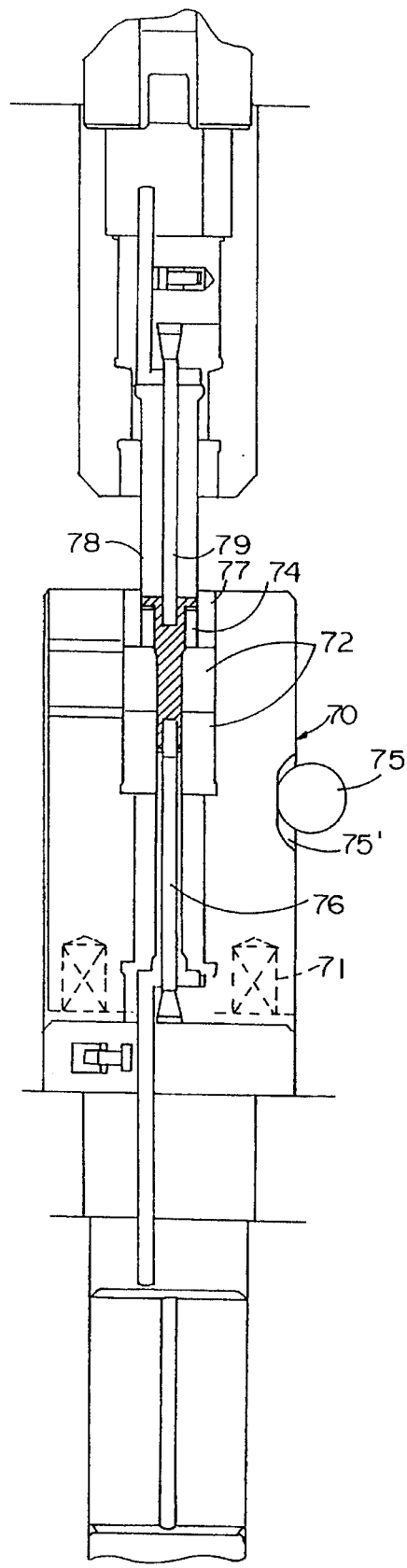
FIG. 9 is a sectional elevational view of the third die station showing the third steps performed on the workpiece.

Valve stem 22 is specially formed according to this invention. The valve stem workpiece starts with a common cylindrical configuration and takes the successive forms shown in FIGS. 2–6, followed by conventional roll forming of the threads into the workpiece of FIG. 6. The method steps applied to the workpiece to form the valve stem in a series of sequential stamping dies are also shown in FIGS. 7–10 in association with progressive dies.

The initial workpiece 22A for one-hundred percent net cold forming of the valve stem is a cylindrical workpiece of a copper alloy, having a length shorter than the final valve stem, having a diameter approximately equal to the pitch diameter of the threaded cylindrical portion 28 of the final product, but larger than the reduced diameter portion 26 and smaller than the enlarged head 30.

This cylindrical workpiece is placed in a first die station 50 which includes suitable liners 52 and 54 of conventional materials used for die forming copper alloys, e.g., carbide. The lower end of the die station cavity is formed by plug 56. Liner 52 includes an axial, cylindrical cavity portion smaller in diameter than workpiece 22A with an appropriately dimensioned sizing land 52', while liner 54 defines a second axial cavity cylindrical portion of a diameter very slightly larger than that of the original workpiece, to be approximately equal thereto. Cooperative with liner 54 is a stamping die plunger 58. It is shown to have a central, tapered punch 58' on the operative axial end thereof. In this die assembly 50, plunger 58 is activated to be rapidly lowered into stamping engagement with the workpiece, thereby forcing the workpiece through sizing land 52' in the top of liner 52, and into liner 52, for axially lengthening the workpiece while circumferentially reducing the one end portion thereof that is forced into liner 52, to form reduced diameter cylindrical portion 26. Plunger 58 also creates a central axial indent 22B' in the free end of the larger diameter portion of modified workpiece 22B. After the die components are retracted, this modified workpiece is ejected from die assembly 50 in FIG. 7, and inserted into a second die assembly 60 in FIG. 8.

Figure 4:
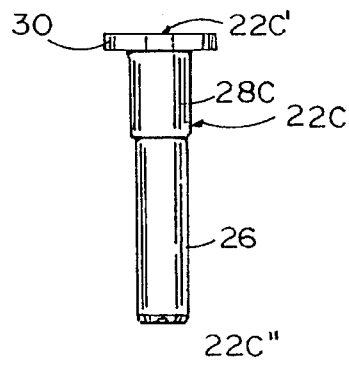
FIG. 4 is an elevational view of the workpiece after the second cold forming steps are performed to form a head and punch a cylindrical axial cavity therein no deeper than the thickness of the head.
Figure 5:
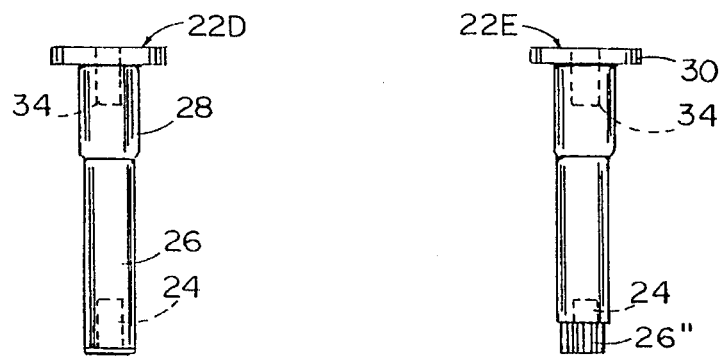
FIG. 5 is an elevational view of the workpiece after the third steps are performed on the workpiece to deepen the head axial cavity while punching the axial cavity in the opposite end.

In die assembly 60, spacers 62 form a first cylindrical cavity equal in diameter to the smaller diameter of the reduced lower end portion of modified workpiece 22B, the bottom of the cavity being filled by plug 66. Spacer 64 defines a cylindrical cavity the diameter of which is substantially equal to that of the larger end portion of workpiece 22B, but terminating short of the outer axial end of this larger portion, where spacer 67 forms a cavity having a substantially enlarged size with a diameter to match that desired for head 30. This die assembly has a double stamping punch assembly including an outer punch 68 which is annular in cross sectional configuration and defines an internal cylindrical cavity in which is a separate central punch 69 of much smaller diameter that axially extends from the lower axial end of outer punch 68. The diameter of punch 69 is smaller than the diameter of any portion of the workpiece and is selected to be that of a desired diameter of a self tapping screw cavity. The amount of extension of punch 69 past the lower end of punch 68 is purposely limited so that the depth of the central axial cylindrical cavity to be created in the enlarged end of the workpiece by punch 69 is no greater than the axial thickness of head 30 being simultaneously formed on workpiece 22B. Specifically, when the die assembly in FIG. 8 is operated, punch 68 shortens larger portion 28 of workpiece 22B to form the generally flat, enlarged diameter head 30 having a thickness of a fraction of an inch. It is important that center punch 69 not create a cavity greater in depth than the thickness of head 30. It has been found that if this cavity is attempted to be punched to a depth greater than the thickness of head 30, the cavity for some reason becomes radially enlarged, axially too long, oblong, and/or has other defects rendering the product useless. Thus, cavity 22C' of modified workpiece 22C preferably has an axial depth at this forming stage about equal to the axial thickness of head 30. Punch 69 causes the portion 28 beneath the head 30 to be axially lengthened a small amount during this stage. The lower plug 66 is shown to have a pointed central indentation punch 66' on its upper end, to form a central, axial indentation 22C" in this smaller diameter, opposite end of the workpiece, as shown in FIG. 4. After the die components are retracted, the modified workpiece 22C is ejected from the die assembly in FIG. 8 and inserted into the die assembly 70 in FIG. 9.

During the operation of this die assembly 70, cylindrical upper cavity 22C' is punched to a greater depth to form final cylindrical cavity 34 having a selected depth greater than the head thickness, as shown in workpiece 22D (FIG. 5) while the workpiece is also punched at indentation 22C" to the desired total depth of cylindrical cavity 24. Cavity 22C' is of a desired size to comprise a self tapping screw cavity. The deepening of cavity 22C' causes cylindrical portion 28 to again be axially lengthened a small amount. Die assembly 70 includes spacers 72 having a cylindrical cavity of a diameter matching that of the smallest diameter end portion 26 of the workpiece, spacer 74 having a cavity matching the diameter of the larger portion 28 of the workpiece, and spacer 77 having a substantially larger cavity diameter matching that of the enlarged head 30 of the workpiece. A lower, central, axial, cylindrical punch 76 having a diameter smaller than the diameter of the smallest portion of the workpiece is utilized to punch cavity 24 into the lower end of the workpiece, while an upper punch 79, basically of the same diameter as the punch 69 in the previous die assembly, is utilized to punch the upper cavity 34 to its final depth considerably greater than the thickness of head 30 of the workpiece. Punch 79 is surrounded by cylindrical stamp 78 which is annular in cross section. This die assembly 70 preferably is mounted on compression springs 71 to allow the appropriate vertical movement of the die assembly, as controlled by guide/stop 75 in an elongated lateral recess 75' of the die assembly as depicted. The workpiece is then ejected from this third die assembly and placed into the fourth die assembly 80 in FIG. 10.

The purpose of die assembly 80 is to form axial splines on the outer periphery of the endmost segment of the smaller diameter portion so as to enable them to interfit with corresponding splines in the interior of handwheel 38. More specifically, the workpiece is forced by upper stamp 88 into the lower end of liner 82 which contains spline forming elements around the periphery of its cavity. These form splines 26" shown on the workpiece 22E in FIG. 6. This workpiece is then ejected from die assembly 80. The purpose of sleeve 86 is to strip the part from pin 87 and eject the part from the die assembly 80. Larger diameter portion 28 then is roll threaded on its periphery using known conventional technology and equipment.

The cylindrical end cavities 34 and 24 are receptive to thread forming screws 36 and 25. The novel process saves considerably on cost of manufacture and avoids machining operations including drilling and tapping of cavities 24 and 34. It is ready for assembly immediately after the forming operations.

These and other features and advantages of the invention will be apparent to those skilled in the art upon studying this disclosure. Further, it is conceivable that certain minor variations could be made in the disclosed technology without departing from the invention. Hence, the invention is not intended to be limited specifically to the illustrated preferred embodiment, but only by the scope of the appended claims and the reasonably equivalent methods to those set forth therein.

The embodiments of the invention in which an exclusive property or privilege is claimed are defined as follows.

1. A method of cold forming a valve stem comprising the steps of:

(1) providing a cylindrical blank workpiece;

(2) enveloping said cylindrical blank workpiece in a die station having an axial cylindrical cavity portion smaller in diameter than said workpiece and having a second axial Cylindrical cavity portion with a diameter approximately equal to that of said workpiece, and axially stamping said workpiece to circumferentially reduce and axially lengthen one end portion of said workpiece to thereby form a larger end portion and a smaller end portion on said workpiece;

(3) enveloping said workpiece in a die station having a cylindrical cavity of a diameter substantially equal to said larger end portion and a second cylindrical cavity having a substantially enlarged diameter equal to that desired for a head, and axially stamping said larger end portion to form a circumferentially enlarged head on said larger end portion, and punching a central axial cylindrical cavity in said head, to a depth no greater than the axial thickness of said head, while allowing said larger portion adjacent said head to lengthen axially; and (4) again punching said central axial cylindrical cavity in said head to a final depth greater than the thickness of said head.

2. The method in claim 1 wherein step 3 includes punching a central axial indentation into the axial end of said workpiece opposite said head.

3. The method in claim 1 including the subsequent step of forming splines into the outer periphery of said circumferentially reduced portion of said workpiece adjacent the axial end of said workpiece opposite said head.

4. The method in claim 1 including the step of roll forming threads into said larger end portion of said workpiece.

5. A method of one-hundred percent net cold forming a valve stem of a copper based alloy comprising the steps of:

(1) providing a cylindrical blank workpiece of copper alloy;

(2) enveloping said blank workpiece in a first die cavity having a first axial die cavity portion of a smaller diameter than that of said blank, and a second axial die cavity portion approximately equal to the diameter of said blank;

(3) stamping said blank workpiece axially to axially lengthen and reduce the diameter of a first end portion of the workpiece to the diameter of said first axial die cavity portion, while simultaneously indenting the center of the opposite, second, larger diameter axial end of said blank;

(4) enveloping said workpiece in a second die cavity having a first reduced axial cavity portion the size of the smaller diameter end portion, a second axial cavity portion of a diameter of said larger diameter end portion, and a third axial portion at the free axial end of said larger end portion, of a diameter substantially greater than said larger end portion;

(5) stamping said workpiece axially to shorten said larger end portion and form a diametrically enlarged head from a part of said larger end portion, while simultaneously axially punching the center of said free axial end of said head to form a cylindrical cavity with a depth no more than the axial thickness of said head;

(6) enveloping said workpiece in a third die cavity;

(7) axially punching said cylindrical cavity to axially increase said cylindrical cavity depth to an amount greater than the thickness of said head and thereby form a self tapping screw receiving cavity, and axially punching the axial end of the workpiece opposite said head to form a second cylindrical self tapping screw cavity; and (8) enveloping said workpiece in a fourth die cavity and forming axially oriented splines around the periphery of said workpiece adjacent said end which is opposite said head.

6. The method of claim 5 including, in step (5), indenting the center of said opposite axial end of said workpiece.

7. The method in claim 5 including the added step of roll forming threads into said larger portion of said workpiece.

* * * * *